(12) United States Patent
Hsieh

(10) Patent No.: US 7,924,505 B1
(45) Date of Patent: Apr. 12, 2011

(54) FREE-SPACE HITLESSLY SWITCHABLE OPTICAL INTERLEAVER

(75) Inventor: Yung-Chieh Hsieh, San Jose, CA (US)

(73) Assignee: Optoplex Corporation, Fremont, CA (US)

( * ) Notice: Subject to any disclaimer, the term of this patent is extended or adjusted under 35 U.S.C. 154(b) by 22 days.

(21) Appl. No.: 12/538,121

(22) Filed: Aug. 8, 2009

Related U.S. Application Data

(60) Provisional application No. 61/092,124, filed on Aug. 27, 2008.

(51) Int. Cl.
*G02B 27/14* (2006.01)

(52) U.S. Cl. ........................ 359/629; 359/638

(58) Field of Classification Search .................. 359/629, 359/636, 637–640; 356/454–456
See application file for complete search history.

(56) References Cited

U.S. PATENT DOCUMENTS 7,408,713 B1 * 8/2008 Hsieh et al. .................. 359/577

* cited by examiner

*Primary Examiner* — Alicia M Harrington
(74) *Attorney, Agent, or Firm* — Antonio R. Durando

(57) ABSTRACT

A reflective surface and a beamsplitting surface are optically coupled to a mirror and to phase optics arranged in interleaver configuration so as to either reflect all light to a single output in an all-pass mode of operation, or to split the incoming beam and produce odd and even channel outputs in an interleaver mode of operation. The direction of the incoming beam is switched hitlessly between the reflective and beamsplitting surfaces by passing the incoming beam through a transparent slab coupled to a rotating mechanism.

16 Claims, 5 Drawing Sheets

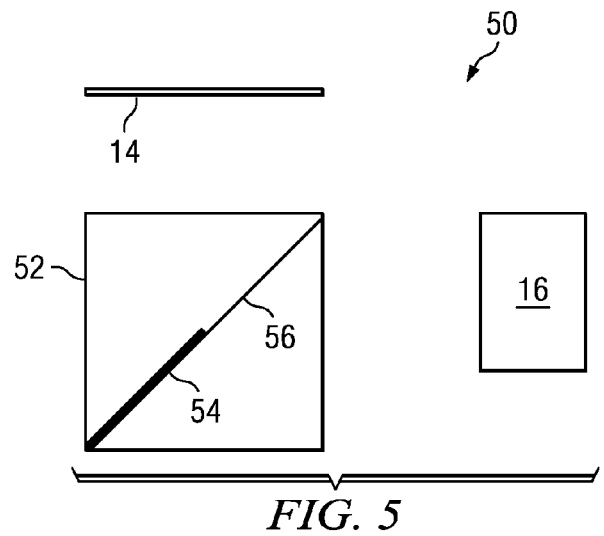
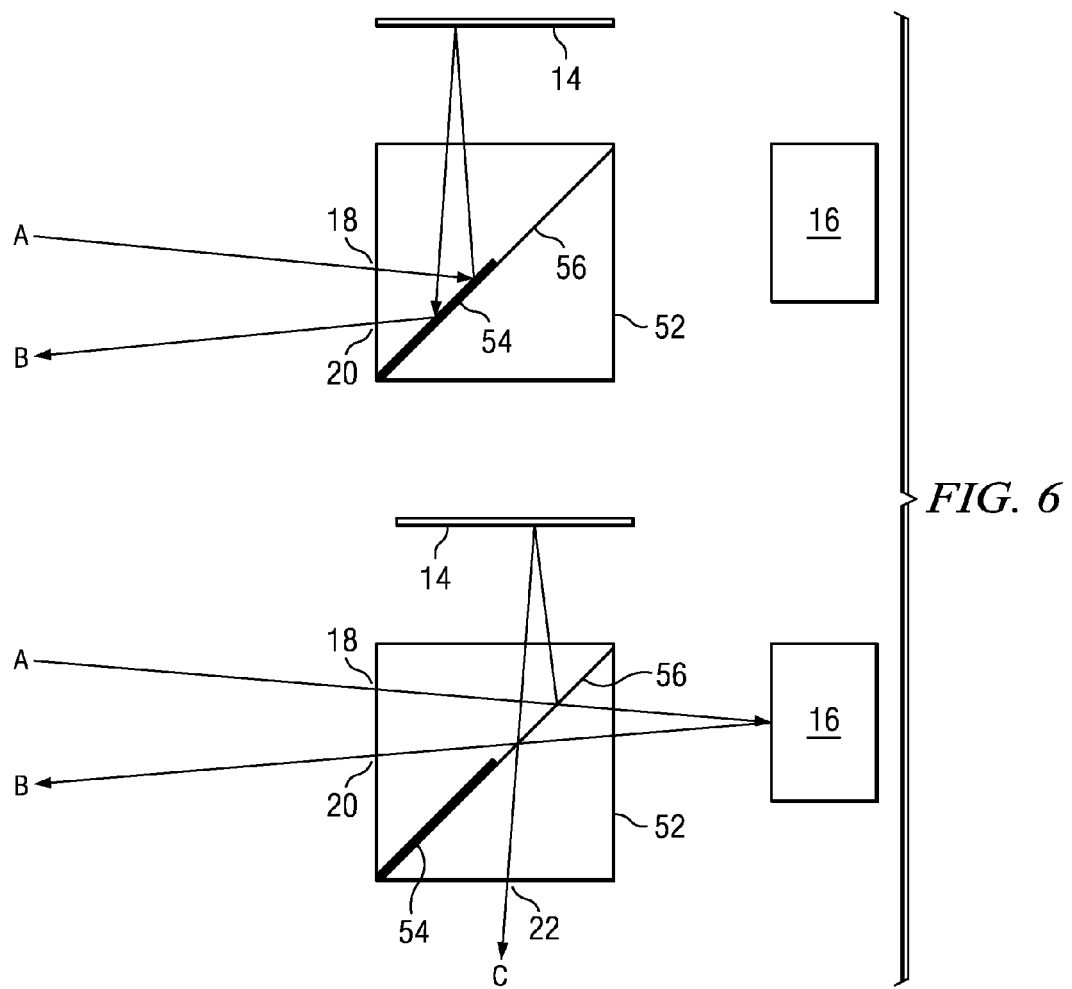
FIG. 5
FIG. 6

FREE-SPACE HITLESSLY SWITCHABLE OPTICAL INTERLEAVER

RELATED APPLICATIONS

This application is based on and claims the priority of U.S. Provisional Application Ser. No. 61/092,124, filed Aug. 27, 2008.

BACKGROUND OF THE INVENTION

1. Field of the Invention

This invention relates to the general field of optical communications and, in particular, to a free-space, hitlessly switchable, optical interleaver.

2. Description of the Prior Art

In optical communications, one fiber can carry many communication channels. Each channel has its own carrier frequency. The light of different frequencies is merged into the fiber through a device called multiplexer ("mux") in the art and is later separated into different ports through a device called de-multiplexer ("de-mux"). The mux and de-mux devices typically utilize technologies such as thin-film filters (TFF) and array wave-guide gratings (AWG).

Thus, in dense wavelength division multiplexing (DWDM) optical communication, various frequencies ($1/\lambda$) of laser light are used as carrier signals (channels) and are coupled into the same optical fiber, which acts as a waveguide. Data signals are superimposed over the carrier signals and are transported in the waveguide. Since the total usable wavelength range is limited (about a few tens of nanometers), as channel spacing is decreased, more channels can fit into the same optical fiber and greater communication capacity is achieved. Therefore, the ability to operate at ever reduced channel spacing is an important objective in the art.

However, channel spacing is limited by the capability of the multiplexer and the de-multiplexer to combine and separate channels without signal overlap. Currently, the standard for channel spacing is 100 GHz (0.8 nm) and manufacturing costs increase dramatically to implement a channel spacing smaller than 100 GHz.

Various methods are known to multiplex and de-multiplex signals with different carrier frequencies (wavelengths). When the total number of channels is less than about 20, the technology based on thin-film filtering is preferred because of its wide bandwidth, its good thermal stability, and the facility with which channels may be added to the system. However, since the channels are de-multiplexed by cascading filters in series, the insertion losses are not uniform among the various channels. In addition, when the channel spacing is about 50 GHz or smaller, narrow-band filters based on thin-film technology add too much chromatic dispersion for some applications.

Therefore, when the number of channels is high (e.g., more than about 40), it has been preferable in the art to use optical devices that provide a more uniform loss throughout the channels and exhibit a smaller chromatic dispersion than thin-film technology. For example, devices based on array waveguide grating (AWG) and diffraction grating provide these advantages. However, such devices tend to produce a narrower bandwidth than thin-film technology, which severely limits their application. In turn, a cost-effective method for increasing the bandwidth of multiplexing and de-multiplexing devices with uniform insertion loss throughout the channels and minimal chromatic dispersion has been achieved through the use of optical interleavers.

With an interleaver, it is possible to use lower resolution filters to mux/de-mux channels with a channel spacing that is smaller than the filter's frequency resolution. For instance, to de-mux eighty channels with a channel spacing of 50 GHz, the interleaver first separates the light into an odd stream and an even stream. The odd stream contains odd-number channels and the even stream contains even-number channels. By doing that, the channel spacing in each stream becomes 100 GHz. Therefore, one can use 100 GHz filters to separate the channels in either stream. Otherwise, one would have to use 50 GHz filters, which are more expensive than 100-GHz ones, to de-mux all 80-channel optical signals.

A conventional free-space de-mux interleaver is a 3-port device. As shown schematically in FIG. 1 in a Michelson interferometer configuration, an optical de-mux interleaver 10 includes a 50/50 beamsplitter 12 combined with a mirror 14 and phase optics 16. A single incoming light beam A is incident on a common (input) port 18 and two output beams B,C exit from respective output ports 20,22. A portion of the incoming beam A is first reflected at point 24 of the beamsplitter, and then it is reflected by the mirror 14 and returned to the beamsplitter at point 26, where it is reflected again and transmitted on a 50/50 energy split. The beam returned to point 26 has a phase that is a linear function of its optical frequency. The other portion of the incoming beam A at point 24 of the beamsplitter is transmitted to and phase shifted by the phase optics 16; then it is returned to the beamsplitter at point 26, where itself is also reflected and transmitted on a 50/50 energy split. This beam returned to point 26 has phase that is a nonlinear function of its optical frequency. The phase difference between the linear phase produced by mirror 14 and the nonlinear phase produced by the phase optics 16 determines which optical frequencies (wavelengths) are in the passband and in the stopband at each of the output ports B and C.

The preferred phase optics 16 consists of a GT (Gires-Tournois) etalon, as illustrated in FIG. 2. The etalon 16 includes a cavity 30 defined by two opposing optical surfaces 32 and 34 on respective optical elements 38 separated by precisely sized spacers 36. The first surface 32 is transmissive and coated with a partially reflective (PR) coating (typically 2-20% reflective), while the second surface 34 is coated with a totally reflective coating. As those skilled in the art readily understand, the length of the spacers 36 and the PR coating are tailored to produce the desired nonlinear phase.

As a result of this arrangement, the beams transmitted and reflected at point 26 interfere constructively and destructively to produce output beams B and C, such that beam B includes all 100 GHz ITU-grid frequencies of the incoming beam A and beam C includes all 50 GHz off-grid channels. Therefore, the device of FIG. 1 functions as a de-mux interleaver with A as an input and B and C as outputs for even and odd channels, respectively. The transmission spectra of the two output ports are complementary to one another. (As used herein, complementary means that light from the common port 18 goes to either output port 20 or output port 22 as a result of energy conservation.) FIG. 3 illustrates the components of an actual free-space Michelson interferometer interleaver 40, wherein the mirror surface is produced by combining a reflective surface 14 with spacers 42 and a transmissive element 44 in optical contact with a beamsplitter cube 46. A GT etalon 16 is similarly placed in optical contact with the cube 46 and the spacer lengths L1 and L2 are selected so as to produce the desired output beams as a result of interference. FIG. 4 illustrates the typical spectra of the beams B (even channels) and C (odd channels) generated at the two output ports when a PR coating of 14% reflection is used in the GT etalon.

This kind of interleaver is very good for applications where a continuous de-mux mode of operation is required. However, some applications require a switchable mode of operation between de-mux and total-pass (i.e., all channels are transmitted to a single output) modes. This is an inexpensive way, for instance, to upgrade a communication system from 100 GHz to 50 GHz. In such cases, it is crucial to be able to switch between modes without loss of signals during the transition phase, an event referred to as a "hit" in the art. Such hits cannot be tolerated in most optical networks. Therefore, this invention is directed at providing a "hitless" switchable de-mux device.

SUMMARY OF THE INVENTION

This invention is based on the idea of providing a device with adjacent reflective and beamsplitting surfaces that can be positioned alternatively with respect to an incoming beam to either reflect all light to a single output or direct the incoming beam into an optical interleaver through the beamsplitting surface. The switching between such alternative positions is obtained either by rotating a plane parallel plate or by translating a wedged plate in the optical path of the incoming beam.

In its simplest and preferred embodiment, the device of the invention comprises a beamsplitting cube wherein a portion of the diagonal beamsplitting surface has been coated to be totally reflective, thereby providing a reflective surface adjacent to a beamsplitting surface. The cube is combined with a mirror optically aligned to receive and reflect back light reflected from either surface. In addition, the cube is coupled to a GT etalon optically aligned so as to receive and reflect back the light transmitted through the beamsplitting surface of the cube. Means for changing the position of the device relative to the direction of travel of the incoming beam (or vice versa) is provided. In the total reflection mode of operation, the device simply transmits all incoming light to a single output channel. In the beamsplitter mode of operation, the incoming light is separated into odd and even channels delivered through respective output ports.

In another embodiment of the invention, a portion of the cube is removed to provide a glass/air interface along a portion of the cube's diagonal surface, thereby creating a totally reflective surface when the incoming beam impinges on the interface with an angle greater than the angle of total internal reflection. The rest of the device is the same as in the preferred embodiment. In either case, the preferred switching mechanism is a transparent slab adapted to rotate and change the direction of the incoming beam either toward the reflective surface or the beamsplitting surface of the cube.

Various other advantages will become clear from the description of the invention in the specification that follows and from the novel features particularly pointed out in the appended claims. Therefore, to the accomplishment of the objectives described above, this invention consists of the features hereinafter illustrated in the drawings, fully described in the detailed description of the preferred embodiments, and particularly pointed out in the claims. However, such drawings and descriptions disclose only some of the various ways in which the invention may be practiced.

BRIEF DESCRIPTION OF THE DRAWINGS

FIG. 5 is a schematic representation of the basic components of a hitlessly switchable interleaver according to the invention wherein the diagonal surface of a beamsplitter is separated into two sections with different optical functionalities.

FIG. 6 illustrates the switchable operation of the interleaver of the invention.

DETAILED DESCRIPTION OF THE INVENTION

Figure 1:
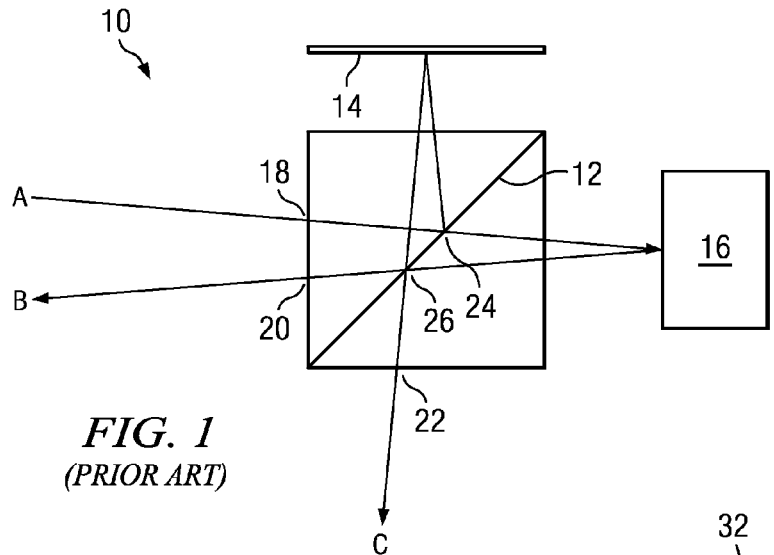
FIG. 1 illustrates schematically a conventional de-mux interleaver as a 3-port device, one common port and two output ports, in a free-space Michelson interferometer configuration.
Figure 2:
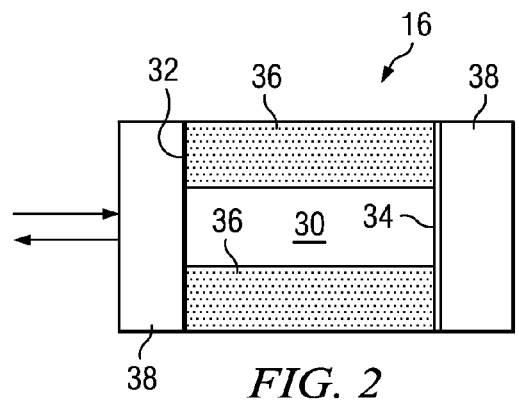
FIG. 2 illustrates schematically the phase optics of the interleaver of FIG. 1 in a GT etalon configuration.
Figure 3:
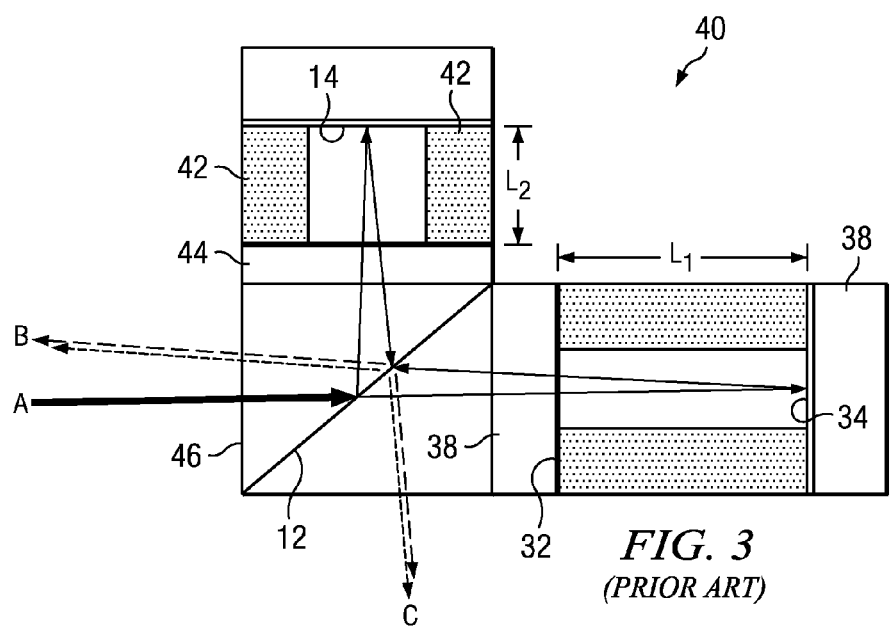
FIG. 3 is a more detailed representation of an actual free-space Michelson interferometer interleaver.
Figure 4:
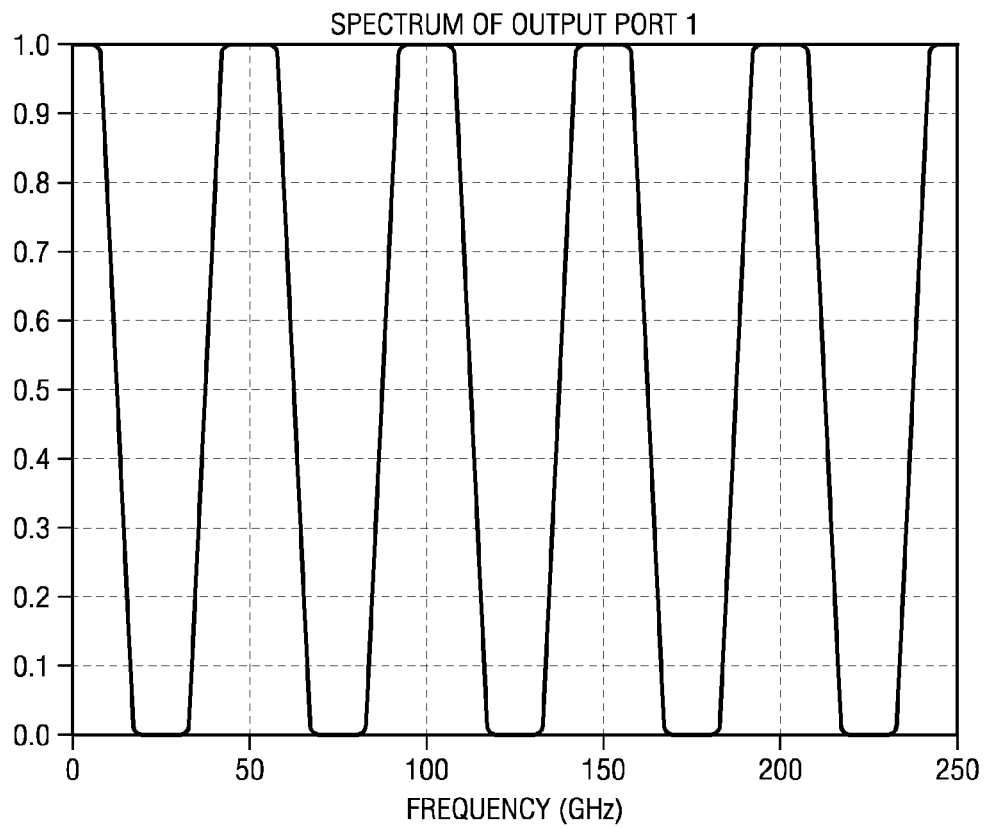
FIG. 4 illustrates the symmetric transmission spectra from the common port to the two output ports of a conventional interleaver.
Figure 4:
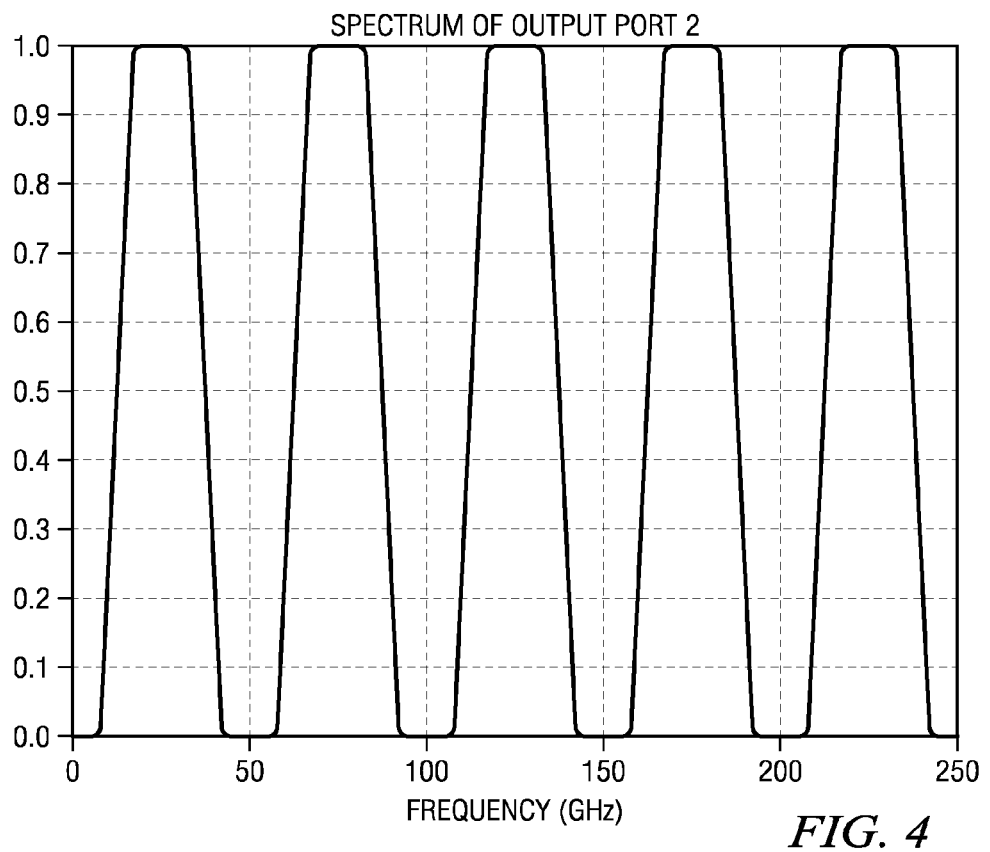

FIG. 5 illustrates the fundamental design of a hitless switchable interleaver 50 according to the invention. An optical surface, preferably the diagonal surface of a cube 52, is divided into a totally reflective (mirror) section 54 and a partially reflective (beamsplitting) section 56. Preferably, the section 56 of the cube is coated with a 50/50 PR coating. The cube 52 is combined with a mirror 14 and phase optics 16 as in the conventional embodiment of FIG. 1. However, the configuration of FIG. 5 is suitable for the two modes of operation illustrated in FIG. 6.

When the incoming beam A impinges on the mirror section 54 of the cube 52, all light is reflected first by the mirror section 54 of the cube, then by the mirror 14, and finally again by the mirror section 54 toward the output port 20, in an all-pass mode of operation (shown in the top diagram of the figure). In such a case, the device 50 is transparent to all wavelengths and all channels are passed unaffected to the single output port 20. When the incoming beam A impinges on the beamsplitting section 56 of the cube 52, as shown in the bottom diagram of FIG. 6, the device 50 operates in interleaver mode. A portion of the incoming beam A is transmitted and processed in conventional interleaver manner by the phase optics 16, while the other portion is reflected by the beamsplitting surface 56 and reflected back by the mirror 14. Thus, the returning beams interfere to produce two output beams B and C at ports 20 and 22, respectively, as detailed above with respect to FIG. 1.

Figure 7:
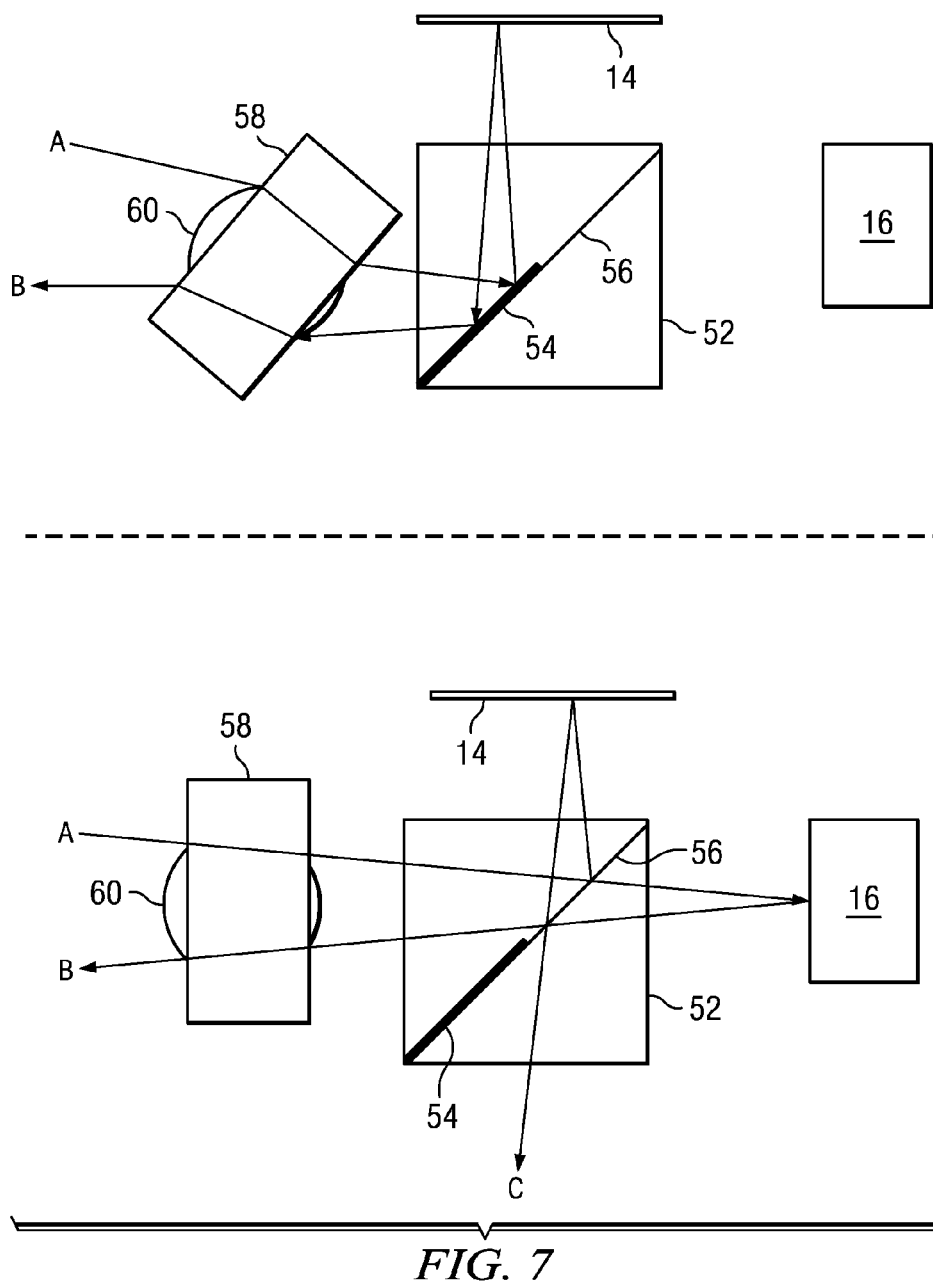
FIG. 7 illustrates the use of a transparent slab to switch in hitless fashion the mode of operation of the interleaver of the invention.

In order to switch between modes of operation, it is necessary to shift the incoming beam A so as to impinge alternatively on only one of the sections 54,56 of the cube 52. This may be achieved by using a beam mover to shift the beam between the beam splitter and the mirror sections on the diagonal surface of the cube. The preferred beam mover is simply a transparent slab 58 with two surfaces parallel to each other, as illustrated in FIG. 7 (a so-called plane parallel plate). When the angle between the input beam A and the slab 58 changes, the position of incidence of the beam at the cube changes accordingly. Thus, by rotating the slab 58 with a suitable mechanism 60, the direction and point of incidence of the beam A can be changed to operate either in all-pass mode (top diagram in the figure) or in interleaver mode (bottom diagram). To make the transition between the two modes hitless, the phase of the light exiting the mirror and the beamsplitter sections of the diagonal surface of the cube should be approximately the same. As those skilled in the art readily understand, this is achieved by using appropriate coatings.

Figure 8:
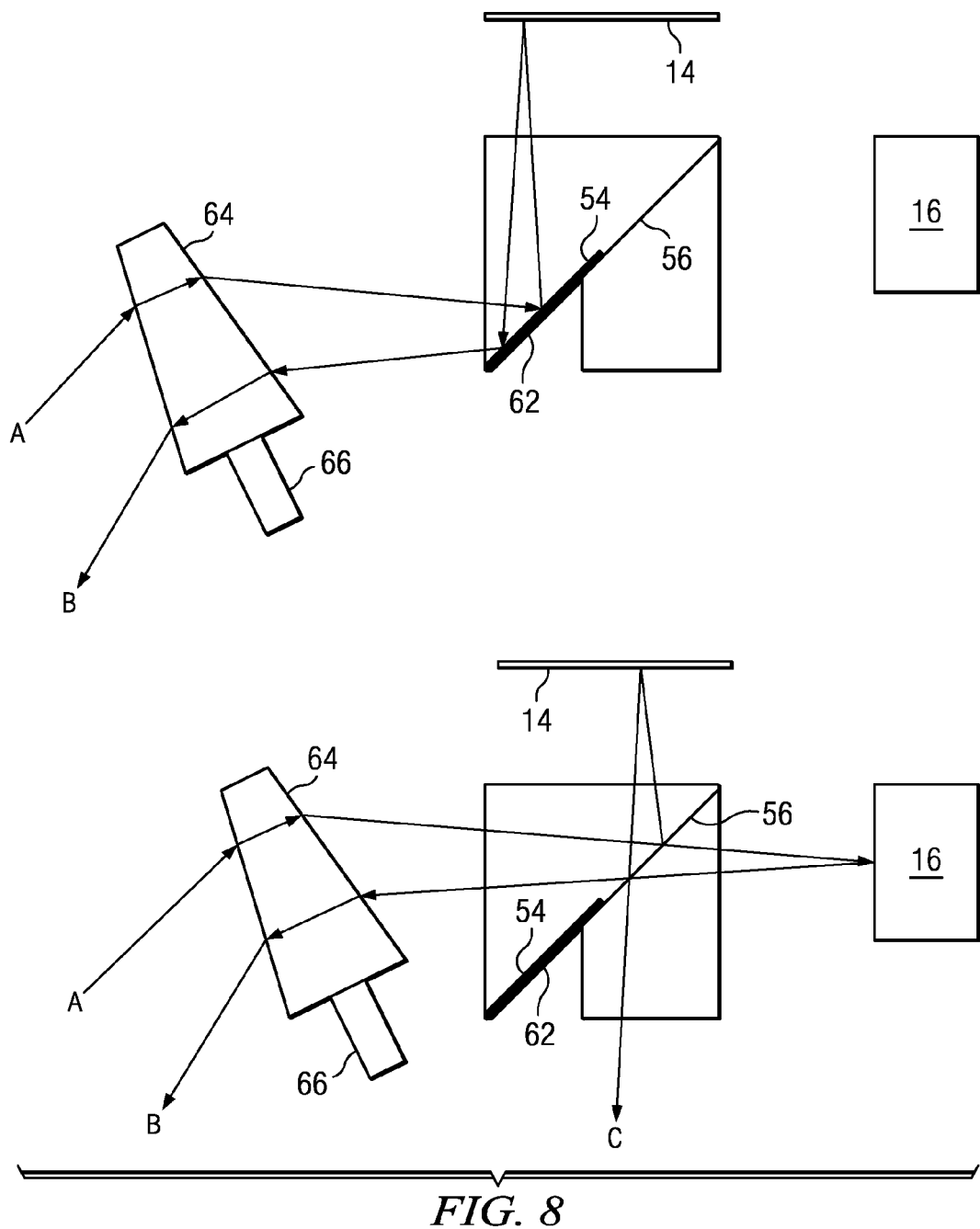
FIG. 8 illustrates schematically an alternative embodiment of the invention wherein a total internal reflection condition is utilized to produce all-pass mode operation.

FIG. 8 illustrates schematically an alternative embodiment of the invention wherein total internal reflection (TIR) is used instead of mirror coating to create the mirror section 54 in the cube of the invention. A portion of the cube 52 is removed to create an interface section 62 between the cube material (typically glass) and air along the diagonal surface of the cube. As a result, when the incoming beam A hits the surface of the glass-air interface section 60 with an incident angle greater than the total internal reflection angle, all the light is reflected. In such case, the TIR glass-air interface plays the role of a mirror and the device operates in all-pass mode, as shown in the top diagram of FIG. 8. When the input beam hits the beamsplitter section 56 of the diagonal surface of the cube, the device operates as an interleaver (illustrated in the bottom diagram of the figure). The direction of the incoming beam A may be switched simply by shifting a transparent wedge 64 in its optical path with a translating mechanism 66, as illustrated in the top and bottom views of FIG. 8.

Thus, a simple device and mode of operation have been disclosed that make it possible to hitlessly switch from all-pass to interleaver processing of an incoming light beam carrying multi-channel signals. While the invention has been shown and described in what are believed to be the most practical and preferred embodiments, it is recognized that departures can be made therefrom within the scope of the invention. For example, while the invention has been illustrated with a cube, it is understood that any structure that would enable switching the incidence of an incoming beam alternatively toward a reflective surface or a beamsplitting surface coupled to a mirror and phase optics as taught herein would be equally suitable. Similarly, a rotating plane parallel plate and a translating wedge have been illustrated for shifting the incoming beam alternatively toward the reflective surface or the beam-splitter surface of the cube. However, any other manner to achieve the same result, such as translating the entire interleaver with respect to the incoming beam, could be used to practice the invention. Therefore, the invention is not to be limited to the details disclosed herein, but is t be accorded the full scope of the claims so as to embrace any and all equivalent apparatus and methods.

I claim:

1. A free-space, hitlessly switchable, optical interleaver comprising:
   a first mirror surface;
   a beam-splitter surface adapted to produce a reflected beam and a transmitted beam;
   a second mirror surface optically coupled to said first mirror surface and said beam-splitter surface;
   a phase-optics device optically coupled to said beam-splitter surface; and
   a device for directing an incoming beam alternatively toward said first mirror surface to operate in all-pass mode or said beam-splitter surface to operate in interleaver mode;
   wherein said phase-optics device is adapted to produce a predetermined phase shift between the reflected and transmitted beams, said phase shift being designed to produce a correspondingly interleaver output.

2. The interleaver of claim 1, wherein said first mirror surface and said beam-splitter surface are positioned along the diagonal surface of a cube.

3. The interleaver of claim 2, wherein said first mirror surface is produced with total reflection coating.

4. The interleaver of claim 2, wherein said cube is partially cut to create a void along said first diagonal surface thereof, and said mirror surface is an interface between said diagonal surface and said void when the incoming beam impinges thereon with an angle greater than the angle of total reflection.

5. The interleaver of claim 1, wherein said phase optics device is a Gires-Tournois etalon.

6. The interleaver of claim 1, wherein said device for directing the incoming beam alternatively toward the first mirror surface or the beam-splitter surface is a transparent slab coupled to a rotating mechanism.

7. The interleaver of claim 1, wherein said device for directing the incoming beam alternatively toward the first mirror surface or the beam-splitter surface is a transparent wedge coupled to translating mechanism.

8. The interleaver of claim 1, wherein said first mirror surface and said beam-splitter surface are positioned along the diagonal surface of a cube; said first mirror surface is produced with total reflection coating; said phase optics device is a Gires-Tournois etalon; and said device for directing the incoming beam alternatively toward the first mirror surface or the beam-splitter surface is a transparent slab coupled to the rotating mechanism.

9. A method of hitlessly switching the operation of an optical interleaver between an all-pass mode and an interleaver mode comprising the following steps:
   providing a first mirror surface;
   providing a beam-splitter surface adapted to produce a reflected beam and a transmitted beam;
   providing a second mirror surface optically coupled to said first mirror surface and said beam-splitter surface;
   providing a phase-optics device optically coupled to said beam-splitter surface, said phase-optics device being adapted to produce a predetermined phase shift between the reflected and transmitted beams, and said phase shift being designed to produce a correspondingly interleaver output; and
   directing an incoming beam alternatively toward said first mirror surface to operate in all-pass mode or said beam-splitter surface to operate in interleaver mode.

10. The method of claim 9, wherein said first mirror surface and said beam-splitter surface are positioned along the diagonal surface of a cube.

11. The method of claim 10, wherein said first mirror surface is produced with total reflection coating.

12. The method of claim 10, wherein said cube is partially cut to create a void along said first diagonal surface thereof, and said mirror surface is an interface between said diagonal surface and said void when the incoming beam impinges thereon with an angle greater than the angle of total reflection.

13. The method of claim 9, wherein said phase optics device is a Gires-Tournois etalon.

14. The method of claim 9, wherein said device for directing the incoming beam alternatively toward the first mirror surface or the beam-splitter surface is a transparent slab coupled to a rotating mechanism.

15. The method of claim 9, wherein said device for directing the incoming beam alternatively toward the first mirror surface or the beam-splitter surface is a transparent wedge coupled to a translating mechanism.

16. The method of claim 9, wherein said first mirror surface and said beam-splitter surface are positioned along the diagonal surface of a cube; said first mirror surface is produced with total reflection coating; said phase optics device is a Gires-Tournois etalon; and said device for directing the incoming beam alternatively toward the first mirror surface or the beam-splitter surface is a transparent slab coupled to the rotating mechanism.

* * * * *